United States Patent
Imatoh (10) Patent No.: US 10,880,484 B2
(45) Date of Patent: Dec. 29, 2020

(54) IMAGING DEVICE AND HORIZONTAL DIRECTION DETECTION METHOD

(71) Applicant: LAPIS SEMICONDUCTOR CO., LTD, Yokohama (JP)

(72) Inventor: Yuki Imatoh, Yokohama (JP)

(73) Assignee: LAPIS SEMICONDUCTOR CO., LTD., Yokohama (JP)

( * ) Notice: Subject to any disclaimer, the term of this patent is extended or adjusted under 35 U.S.C. 154(b) by 135 days.

(21) Appl. No.: 16/041,842

(22) Filed: Jul. 23, 2018

(65) Prior Publication Data

US 2019/0028648 A1   Jan. 24, 2019

(30) Foreign Application Priority Data

Jul. 24, 2017 (JP) ................... 2017-142766

(51) Int. Cl.
*H04N 5/232* (2006.01)
*H04N 5/225* (2006.01)
*H04N 5/262* (2006.01)

(52) U.S. Cl.
CPC ....... *H04N 5/23293* (2013.01); *H04N 5/2257* (2013.01); *H04N 5/23229* (2013.01); *H04N 5/2628* (2013.01); *H04N 5/2254* (2013.01); *H04N 5/23212* (2013.01); *H04N 5/23216* (2013.01); *H04N 5/23248* (2013.01); *H04N 5/23296* (2013.01)

(58) Field of Classification Search
CPC ............. H04N 5/2257; H04N 5/23293; H04N 5/23229; H04N 5/2628; H04N 5/2254; H04N 5/23212; H04N 5/23216; H04N 5/23248; H04N 5/23296
See application file for complete search history.

(56) References Cited

U.S. PATENT DOCUMENTS

| 4,817,178 A * | 3/1989 | Momose | G06F 3/04812 345/157 |
| 2010/0021053 A1* | 1/2010 | Taylor | H04N 1/60 382/162 |
| 2010/0074559 A1* | 3/2010 | Satou | G06T 1/60 382/300 |

FOREIGN PATENT DOCUMENTS

| CN | 101714210 | 5/2010 |
| JP | 2006-287789 | 10/2006 |
| JP | 2009271788 | 11/2009 |

OTHER PUBLICATIONS

"Office Action of China Counterpart Application", dated Oct. 10, 2020, with English translation thereof, pp. 1-12.

* cited by examiner

*Primary Examiner* — Antoinette T Spinks
(74) *Attorney, Agent, or Firm* — JCIPRNET (57) ABSTRACT

An imaging device and a horizontal direction detection method capable of detecting a horizontal angle of a camera with high accuracy in a simple configuration are provided. The imaging device includes an imaging unit configured to obtain image data by photographing a predetermined subject, an image rotation unit configured to cause a display image based on the image data to be rotated on a display plane step by step, a count unit configured to count the number of pixels of a specific color included in the display image in a scanning line direction within the display plane and obtain a count value for each of rotated display images, and a determination unit configured to determine a horizontal direction of a photographing angle of the imaging unit based on the count value for each of the rotated display images.

8 Claims, 6 Drawing Sheets

IMAGING DEVICE AND HORIZONTAL DIRECTION DETECTION METHOD

CROSS-REFERENCE TO RELATED APPLICATION

This application claims the benefit of Japan Application No. 2017-142766, filed on Jul. 24, 2017. The entirety of the above-mentioned patent application is hereby incorporated by reference herein and made a part of this specification.

BACKGROUND

Technical Field

The disclosure relates to an imaging device and a horizontal direction detection method.

Description of Related Art

In an imaging device such as an in-vehicle camera, an imaging angle and an imaging direction are corrected in accordance with a deviation between an actual mounting position and a desired mounting position of the camera. For example, there is proposed an in-vehicle camera orientation correction device having an external camera configured to image an in-vehicle camera and having a translational error correction means configured to correct a translational error based on an image of the in-vehicle camera imaged by the external camera (e.g., Japanese Patent Application Laid-Open No. 2006-287789).

Detection of an angle (for example, a horizontal angle) in the angle correction process is performed by comparing an expected value image with an object in the image to detect an angle from a difference therebetween or performing image recognition in a large-scale software process to calculate a relationship with the object in the image.

In the method of matching with an object in the image, a deviation from the camera image becomes large when a distance is far and it becomes difficult to perform matching. Also, when a large-scale software process is performed, a complicated circuit is required and it is not suitable for hardware mounting.

SUMMARY

According to an embodiment of the disclosure, there is provided an imaging device, including: an imaging unit configured to obtain image data by photographing a predetermined subject; an image rotation unit configured to rotate a display image based on the image data on a display plane step by step; a count unit configured to count a number of pixels of a specific color included in the display image along a scanning line direction within the display plane and obtain a count value for each of the rotated display images; and a determination unit configured to determine a horizontal direction of a photographing angle of the imaging unit based on the count value for each of the rotated display images.

According to an embodiment of the disclosure, there is provided a horizontal direction detection method of detecting a horizontal direction of a photographing angle of an imaging device, the horizontal direction detection method including the steps of: obtaining image data by photographing a subject having a continuous region where regions of a predetermined color are continuous in a horizontal direction or a plurality of regions of the predetermined color arranged at intervals in the horizontal direction; rotating a display image based on the image data on a display plane step by step; counting the number of pixels of a specific color included in the display image along a scanning line direction within the display plane and obtaining a count value for each of the rotated display images; and detecting the horizontal direction based on the count value for each of the rotated display images.

DESCRIPTION OF THE EMBODIMENTS

The disclosure provides an imaging device capable of detecting a horizontal angle of a camera with high accuracy in a simple configuration.

An imaging device according to the disclosure can detect a horizontal angle of a camera with high accuracy in a simple configuration.

Hereinafter, embodiments of the disclosure will be described with reference to the drawings. In the description of the following embodiments and the accompanying drawings, substantially the same or equivalent parts are denoted by the same reference signs.

Figure 1:
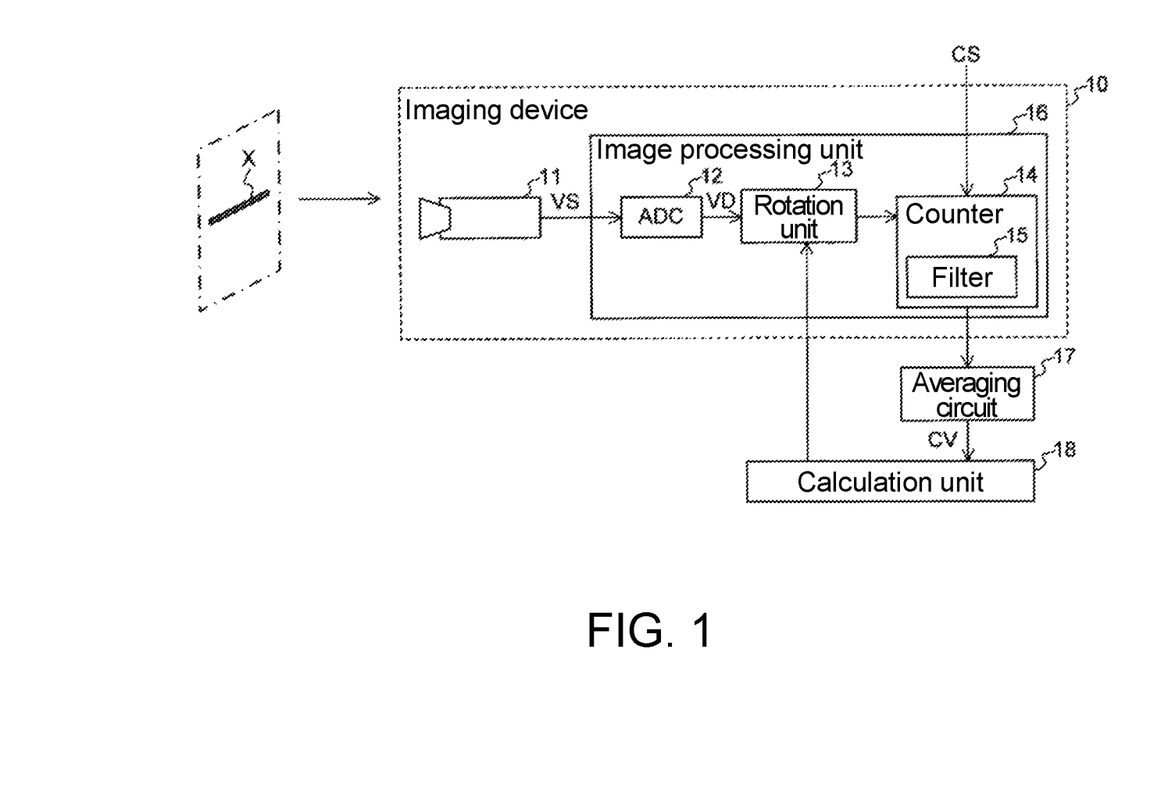
FIG. 1 is a block diagram illustrating a configuration of an imaging device of the present embodiment.

FIG. 1 is a block diagram illustrating a schematic configuration of an imaging device 10 of the present embodiment. The imaging device 10 includes a camera 11, an image processing unit 16, an averaging circuit 17, and a calculation unit 18. The image processing unit 16 includes an analog digital converter (ADC) 12, a rotation unit 13, and a counter 14. The imaging device 10 performs detection of an angle of the camera 11 in the horizontal direction (hereinafter, horizontal detection) based on image data obtained by photographing a subject X. In the following description, a still image and a moving image (a video) are simply collectively referred to as an "image."

The camera 11 is, for example, an in-vehicle camera mounted in a vehicle such as a car, and is fixed at a predetermined mounting position to acquire an image of the surroundings of the vehicle. The camera 11 supplies an analog image signal VS obtained by imaging the subject X to the ADC 12.

Figure 2A:
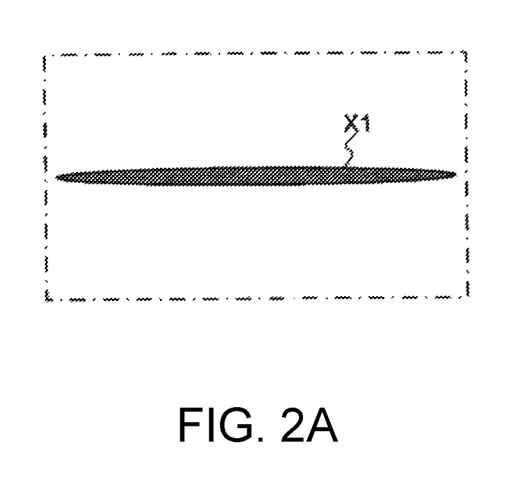
FIG. 2A and FIG. 2B are diagrams schematically illustrating an example of a subject X.
Figure 2B:
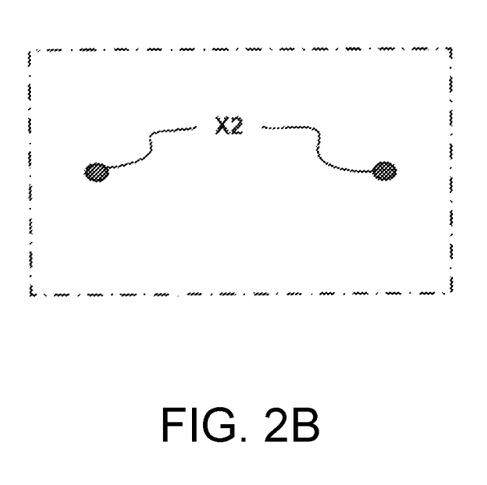

The subject X is a subject for horizontal detection which is installed in an imaging range of the camera 11 for performing the horizontal detection. For example, a subject X1 having regions of the same color that extend in the horizontal direction as illustrated in FIG. 2A or a subject X2 having regions of the same color provided at fixed intervals in the horizontal direction as illustrated in FIG. 2B is selected as the subject X.

Referring again to FIG. 1, the ADC 12 converts the analog image signal VS supplied from the camera 11 into digital data and supplies the digital data to the rotation unit 13 as image data VD.

The rotation unit 13 is an image rotation unit configured to rotate a display image when an image based on the image data VD is displayed on a display plane (not illustrated). The rotation unit 13 rotates the display image step by step at predetermined angles in accordance with control of the calculation unit 18.

The counter 14 counts the number of pixels of a specific color along the scanning line on the display plane with respect to the display image rotated by the rotation unit 13. The counter 14 counts the number of pixels for each of a plurality of scanning lines of the display image and acquires a maximum value within one frame from the number of pixels for each scanning line as the count value.

Also, the counter 14 has a filter 15 for removing a noise component from a series of pixel numbers of the plurality of scanning lines. The filter 15 includes, for example, a low-pass filter, and a high-frequency component indicating an abrupt change in the number of pixels is removed as a noise component through the filter 15. The counter 14 acquires the above-described maximum value from the series of pixel numbers from which the noise component is removed (the maximum value within one frame from the number of pixels for each scanning line) as the count value.

Also, the specific color serving as the count target in the counter 14 is set based on an externally supplied color setting signal CS. Also, the time interval of the rotation of the predetermined angle by the rotation unit 13 corresponds to a time until the counter 14 completes the counting for one frame of the display image. In the following description, the time interval of the rotation of the predetermined angle by the rotation unit 13 is referred to as one frame period.

Figure 3:
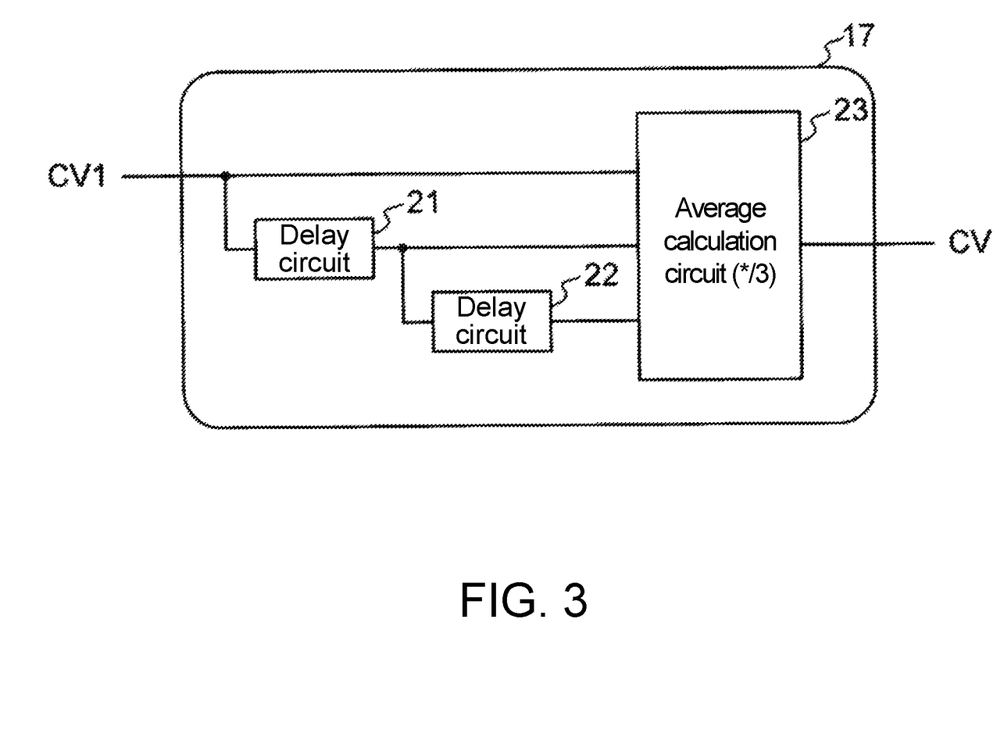
FIG. 3 is a block diagram illustrating a configuration of an averaging circuit.

The averaging circuit 17 is a circuit configured to calculate an average value of the count values of a plurality of frames (for example, three frames) output from the counter 14. As illustrated in FIG. 3, for example, the averaging circuit 17 includes a delay circuit 21, a delay circuit 22, and an average calculation circuit 23.

Each of the delay circuit 21 and the delay circuit 22 is a delay circuit configured to delay each input count value by one frame period and output the delayed count value. For example, when a count value CV1 is assumed to be output from the counter 14, the delay circuit 21 outputs a count value CV2 obtained by delaying the count value CV1 by one frame period and supplies the count value CV2 to the delay circuit 22 and the average calculation circuit 23. The delay circuit 22 outputs a count value CV3 obtained by delaying the count value CV2 by one frame period and supplies the count value CV3 to the average calculation circuit 23. The average calculation circuit 23 calculates an average value of the count values CV1 to CV3 for three frame periods and outputs the calculated average value as an average count value CV (hereinafter simply referred to as a count value CV).

Referring again to FIG. 1, the calculation unit 18 detects a horizontal angle of the camera 11 based on the rotation angle of the rotation unit 13 and the count value CV.

Figure 4:
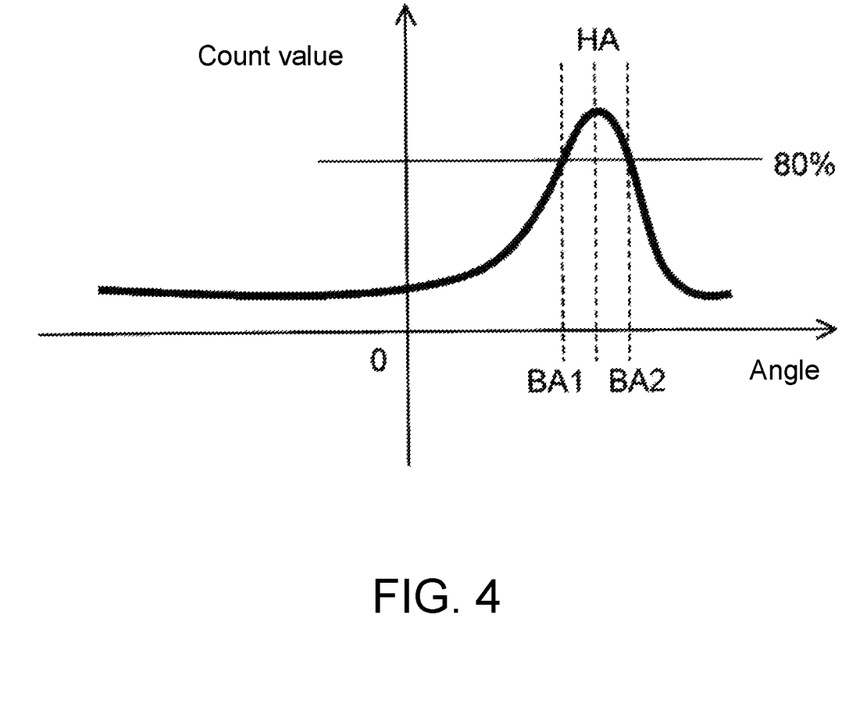
FIG. 4 is a diagram illustrating an example of detection of a horizontal angle based on a count value.

As illustrated in FIG. 4, for example, the calculation unit 18 sets a value of 80% of a count value assumed when the number of pixels of a specific color in the subject X is counted in the horizontal direction as a threshold value, and compares the count value CV with the threshold value. Then, the calculation unit 18 detects an angle BA1 at which the count value CV changes from less than the threshold value to the threshold value or more and an angle BA2 at which the count value CV changes from the threshold value or more to less than the threshold value and calculates an average value of the angles BA1 and BA2, thereby detecting a horizontal angle HA (i.e., horizontal angle HA=(angle BA1 greater than threshold value+angle BA2 less than threshold value)/2).

Figure 5:
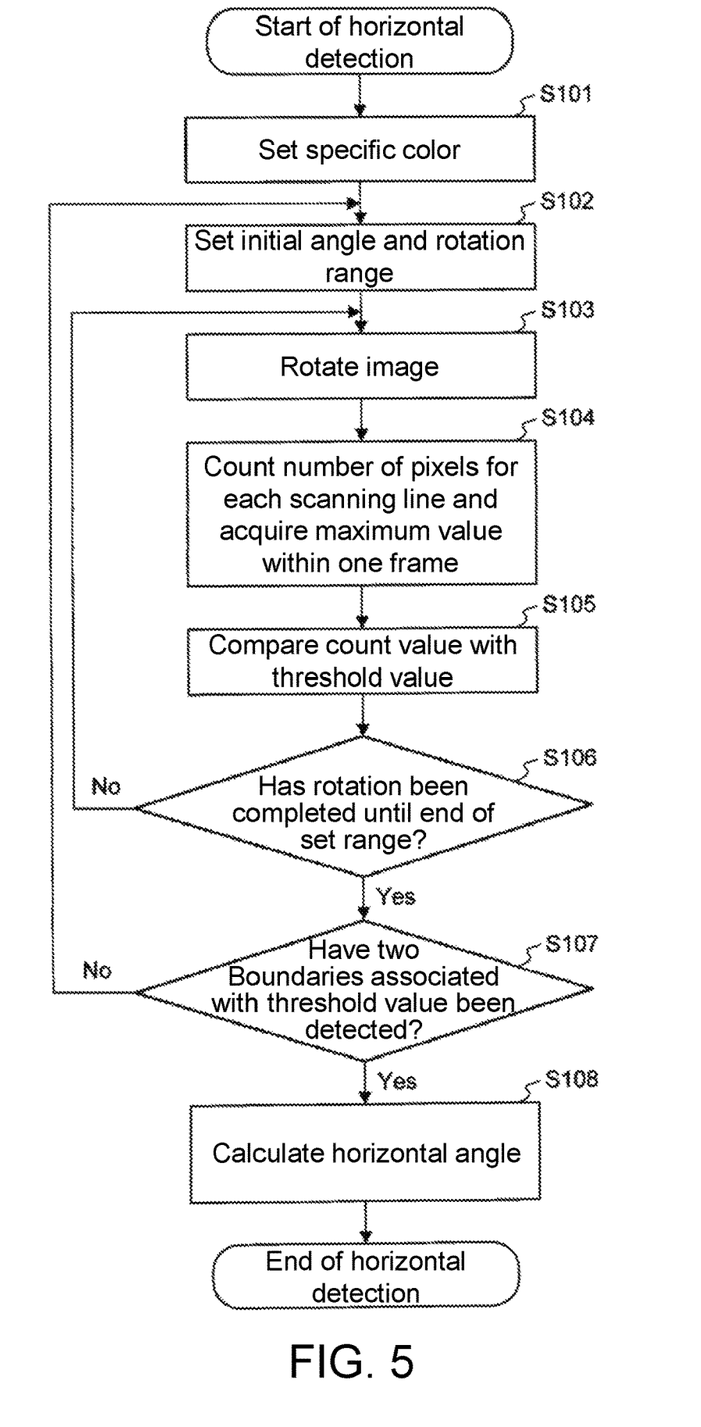
FIG. 5 is a flowchart illustrating a processing operation of a horizontal detection process.

Next, an operation of the horizontal detection process in the imaging device 10 of the present embodiment will be described with reference to the flowchart of FIG. 5.

The imaging device 10 starts a process in a state in which the subject X having regions of the same color extending in a direction assumed to be the horizontal direction or located at fixed intervals is arranged in an imaging range of the camera 11.

First, the counter 14 sets a specific color serving as a count target for the number of pixels based on the externally supplied color setting signal CS (step S101). The specific color is specified based on a color of the subject X.

Figure 6A:
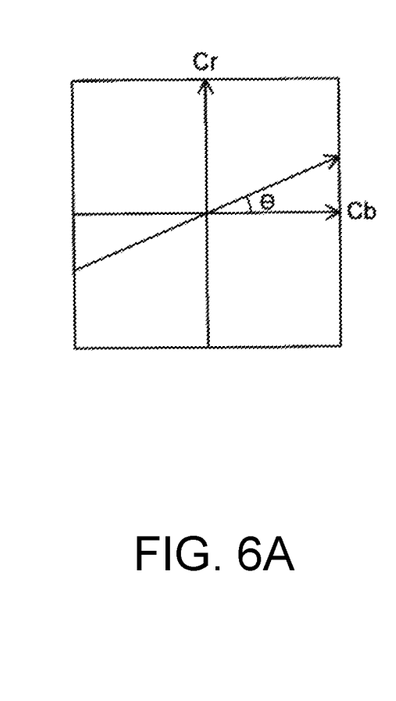
FIG. 6A and FIG. 6B are diagrams schematically illustrating specification of a specific color.
Figure 6B:
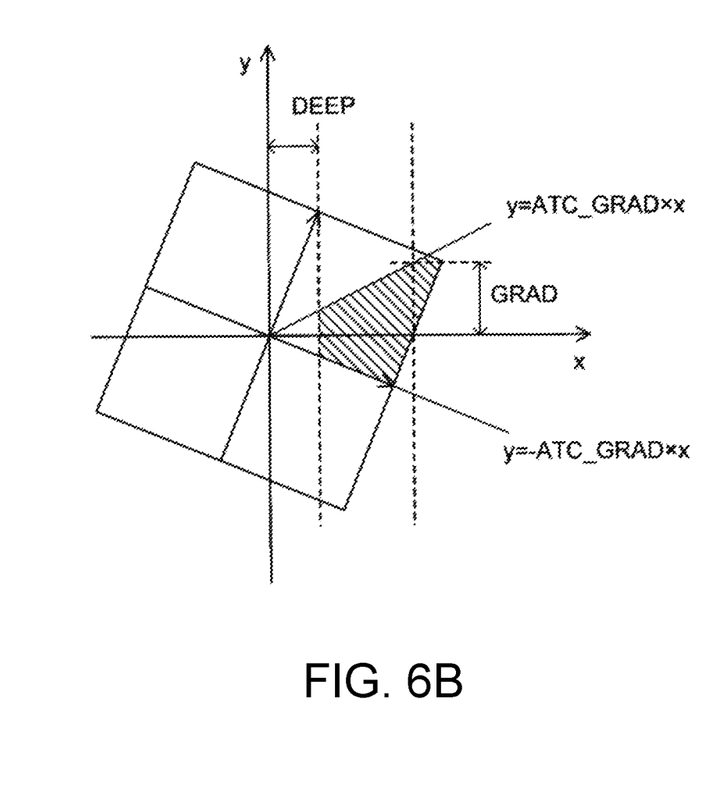

FIG. 6A and FIG. 6B are diagrams schematically illustrating a method of specifying a specific color. In the imaging device 10 of the present embodiment, a specific color is specified based on a YCbCr scheme.

First, as illustrated in FIG. 6A, a color angle θ is specified based on a color of the subject X on a color difference plane in which a color difference Cb of blue is set as an X-direction (a horizontal axis) and a color difference Cr of red is set as a Y-direction (a vertical axis).

Then, as illustrated in FIG. 6B, the range of the specific color is specified by determining a range of a gradient and a density with reference to the specified color angle θ. For example, on a plane obtained by tilting the color difference plane in accordance with the color angle θ, a y-direction (indicated as GRAD in FIG. 6B) represents a range of a gradient and an x-direction (indicated as DEEP in FIG. 6B) represents a range of a density. For example, y=ATC_GRAD×x and y=−ATC_GRAD×x, so that a range therebetween is specified as the range of the gradient. Also, a range greater than or equal to x=dx is specified and a region whose density is greater than or equal to a predetermined value (a region of less than x=dx) is excluded from the range. Thereby, a hatched region in FIG. 6B is specified as the range of the specific color.

Referring again to FIG. 5, the calculation unit 18 sets an initial angle of rotation and a rotation range in the rotation unit 13 (step S102). For example, −3° is set as the initial angle, and a range from −3° to 3° is set as the rotation range.

The rotation unit 13 rotates the display image based on image data VD in accordance with the control of the calculation unit 18 (step S103). For example, the rotation unit 13 performs rotation for the initial angle)(−3° in initial rotation and performs rotation of a predetermined angle (for example, 0.3°) in second and subsequent rotations.

The counter 14 counts a number of pixels of a specific color in the scanning line direction of the display plane with respect to the display image rotated by the rotation unit 13. The counter 14 counts the number of pixels for one frame of the display image, i.e., for all the scanning lines, and acquires a maximum value thereof (a maximum value in the number of pixels from which the noise component is removed) as the count value (step S104).

The calculation unit 18 acquires the count value CV from the counter 14 via the averaging circuit 17 and compares the count value CV with the threshold value (step S105). The calculation unit 18 causes a comparison result to be temporarily stored in a storage means such as a memory (not illustrated).

The calculation unit 18 determines whether or not the rotation of the display image has been completed until an end of the rotation range set in step S102 (step S106). When it is determined that the rotation has not been completed (step S106: No), the processing of steps S103 to S105, i.e., the rotation of the display image by the rotation unit 13, the acquisition of the count value by the counter 14, and the process of comparing the count value from the calculation unit 18 with the threshold value, are iterated.

On the other hand, when it is determined that the rotation has been completed (step S106: Yes), it is determined whether or not two angles which are boundaries between the count value and the threshold value, i.e., an angle BA1 changed from less than the threshold value to the threshold value or more and an angle BA2 changed from the threshold value or more to less than the threshold value, have been detected (step S107).

When it is determined that the two angles which are the boundaries associated with the threshold value have not been detected (step S107: No), the calculation unit 18 returns to step S102 and resets the initial angle and the rotation range. For example, if the angles of the boundaries have not been detected in the initial angle of −3° and the rotation range of −3° to 3°, the calculation unit 18 resets the initial angle to −5° and resets the rotation range to a range of −5° to 5. After resetting, the processing of steps S103 to S107 is iterated.

On the other hand, if it is determined that the two angles which are the boundaries associated with the threshold value have been detected (step S107: Yes), the calculation unit 18 calculates the horizontal angle HA based on the angles of the boundaries (the angles BA1 and BA2) (step S108) and completes the process.

As described above, in the imaging device 10 of the present embodiment, the number of pixels of a specific color is counted along the scanning line direction while the display image obtained by photographing the subject X is rotated step by step and the horizontal direction of the camera 11 is detected by comparing the count value with the threshold value.

According to the imaging device 10 of the present embodiment, it is possible to detect the horizontal direction of the camera 11 in a simple configuration including the counter 14 configured to count the number of pixels of the specific color, the calculation unit 18 configured to compare the count value with the threshold value, and the like.

Also, because the counter 14 has the filter 15, it is possible to acquire the count value in a state in which instantaneous environmental noise is reduced and it is possible to detect the horizontal direction with high accuracy.

Also, because the specific color is set using a color angle, a gradient, and a density of a color difference CbCr, it is possible to set the specific color irrespective of the brightness and it is possible to absorb an error according to an environment of a subject and a type of camera.

Also, the disclosure is not limited to the above embodiment. For example, in the above embodiment, a case in which the filter 15 includes a low-pass filter has been described. However, it is only necessary for the filter 15 to be configured to remove a noise component, and the filter 15 may be, for example, a band pass filter or a high pass filter.

Also, in the above embodiment, a case in which the averaging circuit 17 includes the delay circuit 21, the delay circuit 22, and the average calculation circuit 23 has been described. However, the configuration of the averaging circuit 17 is not limited thereto and it is only necessary for the configuration of the averaging circuit 17 to be a configuration in which it is possible to calculate an average of count values for a plurality of frames.

Also, in the above embodiment, an example in which the horizontal angle is calculated by setting 80% of the count value assumed in a case in which it is horizontal as the threshold value and calculating an average between an angle at which the count value CV is greater than the threshold value and an angle at which the count value CV is less than the threshold value has been described. However, a method of selecting the threshold value and a method of calculating the horizontal angle are not limited thereto and it is only necessary for the calculation unit 18 to calculate the horizontal angle by comparing the count value CV with a predetermined threshold value.

Also, in the above embodiment, an example in which it is determined whether or not two angles which are boundaries associated with a threshold value (an angle changed from less than the threshold value to the threshold value or more and an angle changed from the threshold value or more to less than the threshold value) have been detected after the initial angle and the rotation range was set and the rotation was performed, and the initial angle and the rotation range are reset to perform the rotation if the angles have not been detected has been described. However, if the two angles which are the boundaries associated with the threshold value are not detected within the initially set rotation range, a configuration in which the rotation range is not reset and the rotation is further performed in excess of an original rotation range until the angle is detected may be adopted. That is, it is only necessary to configure the calculation unit 18 for controlling the rotation unit 13 so that rotation is performed until the two angles which are the boundaries associated with the threshold value are detected.

What is claimed is:

1. An imaging device, comprising:
    an imaging unit configured to obtain image data by photographing a predetermined subject;
    an image rotation unit configured to rotate a display image based on the image data for an initial angle of a rotation range in an initial rotation and rotate the display image step by step at a predetermined angle in subsequent rotations until an end of the rotation range on a display plane;
    a count unit configured to count a number of pixels of a specific color included in the display image along a scanning line direction within the display plane and obtain a count value for each of the rotated display images; and
    a determination unit configured to determine a horizontal direction of a photographing angle of the imaging unit based on the count value for each of the rotated display images.

2. The imaging device according to claim 1, wherein the count unit counts the number of pixels of the specific color along each of a plurality of scanning lines within the display plane and sets a maximum value from the number of pixels for each scanning line as the count value.

3. The imaging device according to claim 1, wherein the count unit includes a filter unit configured to remove a noise component included in a series of pixel numbers including the number of pixels for a plurality of scanning lines within the display plane, and acquires the count value based on the series of pixel numbers from which the noise component is removed.

4. The imaging device according to claim 1, comprising:
    an averaging circuit configured to calculate an average value of the count values for the plurality of display images rotated at different angles,
    wherein the determination unit determines the horizontal direction of the photographing angle of the imaging unit based on the average value.

5. The imaging device according to claim 4, wherein the determination unit compares the average value with a predetermined threshold value and determines the horizontal direction based on an angle range of the rotation when the average value is greater than or equal to the predetermined threshold value.

6. The imaging device according to claim 1,
wherein the subject has a continuous region where regions of a predetermined color are continuous in a horizontal direction or a plurality of regions of the predetermined color arranged at intervals in the horizontal direction, and
wherein the count unit sets the specific color serving as a count target in accordance with a color setting signal generated based on the predetermined color of the subject.

7. The imaging device according to claim 6, wherein the count unit sets the specific color in accordance with the color setting signal generated using a color angle, a gradient, and a density of a color difference of blue and a color difference of red.

8. A horizontal direction detection method of detecting a horizontal direction of a photographing angle of an imaging device, the method comprising the steps of:
obtaining image data by photographing a subject having a continuous region where regions of a predetermined color are continuous in a horizontal direction or a plurality of regions of the predetermined color arranged at intervals in the horizontal direction;
rotating a display image based on the image data for an initial angle of a rotation range in an initial rotation and rotate the display image step by step at a predetermined angle in subsequent rotations until an end of the rotation range on a display plane;
counting the number of pixels of a specific color included in the display image along a scanning line direction within the display plane and obtaining a count value for each of the rotated display images; and
detecting the horizontal direction based on the count value for each of the rotated display images.

* * * * *